United States Patent [19]

Ravenberg et al.

[11] Patent Number: 5,439,246
[45] Date of Patent: Aug. 8, 1995

[54] MULTI-DIRECTIONAL AIR BAG MODULE DOOR ATTACHMENT

[75] Inventors: Michael J. Ravenberg, Corinne; Mark A. Thompson; David J. Green, both of Brigham City; Terry R. Davis, Layton, all of Utah; Jeffery L. Scharret, Rochester Hills; Russell S. Gans, Westland, both of Mich.

[73] Assignee: Morton Internatinal, Inc., Chicago, Ill.

[21] Appl. No.: 192,919

[22] Filed: Feb. 7, 1994

[51] Int. Cl.⁶ .............................................. B60R 21/16
[52] U.S. Cl. ................................... 280/728.3; 280/732
[58] Field of Search ................. 280/728 A, 728 B, 732

[56] References Cited

U.S. PATENT DOCUMENTS

| | | | |
|---|---|---|---|
| 4,770,439 | 9/1988 | Maier et al. | 280/732 |
| 4,834,421 | 5/1989 | Korber et al. | 280/732 |
| 4,941,678 | 7/1990 | Lauritzen et al. | 280/732 |
| 5,087,067 | 2/1992 | Seki et al. | 280/732 |
| 5,183,288 | 2/1993 | Inada et al. | 280/732 |
| 5,190,314 | 3/1993 | Takasugi | 280/752 |
| 5,209,519 | 5/1993 | Shiga et al. | 280/728 A |
| 5,211,421 | 5/1993 | Catron et al. | 280/728 A |
| 5,217,253 | 6/1993 | Pray | 280/728 A |
| 5,306,042 | 4/1994 | Frank | 280/728 B |
| 5,348,339 | 9/1994 | Turner | 280/728 B |

Primary Examiner—Kenneth R. Rice
Attorney, Agent, or Firm—Nick C. Kottis; Gerald K. White

[57] ABSTRACT

An air bag module door and installation method whereby an air bag module door is joined to an air bag module unit by of one or more flexible legs. The flexible leg(s) permit the so joined module door to be desirably positioned within an opening in a vehicular interior trim. Once so positioned, the module unit is rigidly secured to the vehicle.

20 Claims, 7 Drawing Sheets

MULTI-DIRECTIONAL AIR BAG MODULE DOOR ATTACHMENT

BACKGROUND OF THE INVENTION

This invention relates generally to inflatable passive restraint systems for use in vehicles for restraining the movement of a seated occupant during a collision and, more particularly, to air bag modules units and the attachment of air bag module doors therein.

The value of safety restraint systems which self-actuate from an undeployed to a deployed state without the need for intervention by the operator, i.e., "passive restraint systems" and particularly those restraint systems incorporating inflatable bags or cushions has gained general appreciation.

It is well known to protect a vehicle occupant using a cushion or bag that is inflated with gas, e.g., an "air bag" when the vehicle encounters sudden deceleration, such as in a collision. Vehicular inflatable restraint systems generally include multiple crash sensors. Such crash sensors are generally positioned about or mounted to the frame and/or body of the subject vehicle and serve to sense sudden decelerations by the vehicle. In turn, one or more of the sensors send a signal to an inflatable bag module/assembly strategically positioned within the riding compartment of the vehicle to actuate deployment of the air bag.

In such systems, the air bag is normally housed in an uninflated and folded condition to minimize space requirements. Upon actuation of the air bag system, gas is discharged from an inflator to rapidly inflate the bag. During deployment, the rapidly evolving gas with which the bag is typically filled is an inert gas, e.g., nitrogen.

In general, such systems are designed to result in inflation of the air bag in a matter of a few milliseconds and with the bag thus serving to restrain the movement of the vehicle occupant as the collision proceeds.

Inflatable restraint systems have been devised for automotive vehicles in which one or more air bags are stored in one or more storage compartments within the vehicle. In general, an air bag provided for the protection of a vehicle driver, i.e., a driver side air bag, is stored within a module including an inflator, the air bag itself, a housing, a door/cover or some form of closure panel member, and attachment means mounted in the steering wheel of the vehicle. Whereas, an air bag for the protection of a front seat passenger, i.e., a passenger side air bag, is typically stored within a module mounted in the instrument panel/dash board of the vehicle. In either case, the door/cover of such installations commonly include a face portion which, in the standard state, provides closure to the assembly. Upon activation of the system and initial bag deployment, the door/cover(s) move out of the way, e.g., "open," to form an opening through which the air bag will be deployed.

In order to improve the aesthetic appearance of the closure and to reduce the likelihood of tampering with the system, such closure panel members or doors are commonly designed so as to minimize the visual impression of the presence of the air bag and air bag deployment opening thereunder, e.g., improve fir and finish.

In general, product designs involving several interfitting pieces, each sized and shaped to particular production tolerances, are subject to tolerance stack-ups that can become significant. With respect to air bag module closures, such tolerance stack-ups can detrimentally effect the fit and finish of the vehicle interior trim. In addition, large tolerance stack-ups can result in increased part rejection and therefore in increased production cost. Thus, prior closure panel member designs have sought to reduce tolerance stack-up such as through design modifications and/or through the use of special tooling and/or processing. Such efforts, however, have tended to suffer as being too costly and/or time consuming.

Thus, a closure panel design is desired that minimizes and/or avoids tolerance stack-ups and the problems associated therewith or resulting therefrom.

SUMMARY OF THE INVENTION

A general object of the invention is to provide an improved air bag module door and installation method whereby an air bag module door is positioned within an opening in a vehicular interior trim and the door is secured to an air bag module unit within the vehicle.

A more specific objective of the invention is to overcome one or more of the problems described above.

The general object of the invention can be attained, at least in part, through an air bag module door for an air bag module unit, the module door having a face portion and at least one flexible leg joined at a first end to the face portion and joinable at a second end to a corresponding mounting section of the module unit. The face portion provides closure to an opening in the interior trim structure of a vehicle wherethrough an air bag is deployable. The face portion has an upper surface, a lower surface and a peripheral surface between the upper and lower surfaces. At least a portion of the peripheral surface is supportable by an underlying portion of the interior trim structure. The flexible leg permits the face portion to be positioned about the air bag deployment opening as the module unit is secured to the vehicle.

Thus, the invention provides air bag module doors that result in improved fit and finish within the vehicle interior. The air bag module doors of the invention facilitate adjustment to fit the mating portion of the interior trim structure, e.g., the vehicle instrument panel.

Prior art air bag module doors and the installation thereof can generally suffer from significant misalignment and/or mismatch with the respective vehicular trim which in turn create concerns as to the fit and finish of the doors within the vehicle interior. Further, prior art attempts to address corresponding tolerance stack-up concerns such as through design modifications and/or through the use of special tooling and/or processing have tended to suffer as being too costly and/or time consuming.

The invention further comprehends an air bag module door for an air bag module unit which includes a reaction canister. The module door includes a face portion to provide closure to an air bag deployment opening in an instrument panel of a vehicle. The face portion has an upper surface, a lower surface and a peripheral surface between the upper and lower surfaces with the peripheral surface including at least two opposed longitudinal sides. At least a portion of the peripheral surface is supportable by an underlying mating surface portion of the instrument panel.

The module door further includes at least one first flexible leg integral with the lower surface of the face portion and adjacent a first of the opposed longitudinal sides. The first flexible leg permits the face portion to be positioned about the air bag deployment opening as the module unit is rigidly secured to the vehicle. The first flexible leg includes a male form slide-in connector at an end thereof for slide-in fastenerless connection with a corresponding mating female form slide-in connector on the reaction canister.

The module door also includes at least one second flexible leg integral with the face portion at the bottom side and adjacent a second of the opposed longitudinal sides. The second flexible leg further permits the face portion to be positioned about the air bag deployment opening as the module unit is rigidly secured to the vehicle. The second flexible leg includes a male form connector at an end thereof for snap-in engagement with a corresponding mating female form snap-in connector on the reaction canister and wherein under the influence of an inflating air bag, the male form snap-in connector disengages from the female form snap-in connector as the air bag deploys out of the opening with the face portion pivotally hinging open about at least the first flexible leg.

The invention still further comprehends a method for positioning an air bag module door within an instrument panel air bag deployment opening of a vehicle and securing the module door to an air bag module unit within the vehicle. In such a method, the module door includes a face portion to provide closure to the air bag deployment opening. The face portion has an upper surface, a lower surface and a peripheral surface between the upper and lower surfaces. The module door further includes at least one integral flexible leg having an end joinable to a corresponding mounting section of the module unit.

In the method, the module door is floatably joined to the module unit by means of joining the end of the leg to a corresponding mounting section of the module unit. The floatably joined module door is then positioned over the air bag deployment opening with at least a portion of the periphery of the door being supported by an underlying portion of the instrument panel. The floatably joined door can move in at least two directions relative to the air bag deployment opening selected from longitudinally, laterally, and vertically. The module unit, with the positioned floatably joined door, is then rigidly secured to the vehicle. This results in the joined flexible leg becoming tensioned and the module door being in a fixed position relative to the air bag deployment opening in the at least the two selected directions.

As used herein, references to a item as being "integral" to a structure are to be understood to refer to the specified item as being formed together with and as a part of the particular structure as opposed to the specified item either prior or later being joined or fastened to the particular item or a precursor thereof.

Further, references herein to items being "floatably joined" are to be understood to refer to the ability to flex, extend, or contract in the specified directions so as to adjust to the interior trim structure, e.g., the instrument panel interface.

Other objects and advantages will be apparent to those skilled in the art from the following detailed description taken in conjunction with the appended claims and drawings.

Figure 1:
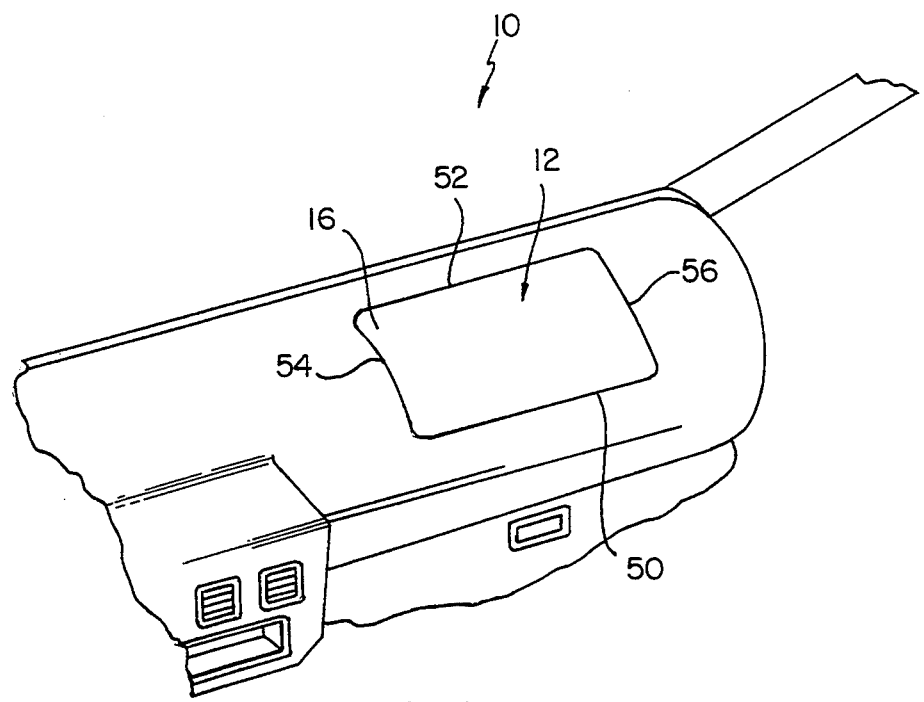
FIG. 1 is a simplified fragmentary perspective view of a vehicle interior incorporating an air bag module door, in accordance with one embodiment of the invention.
Figure 2:
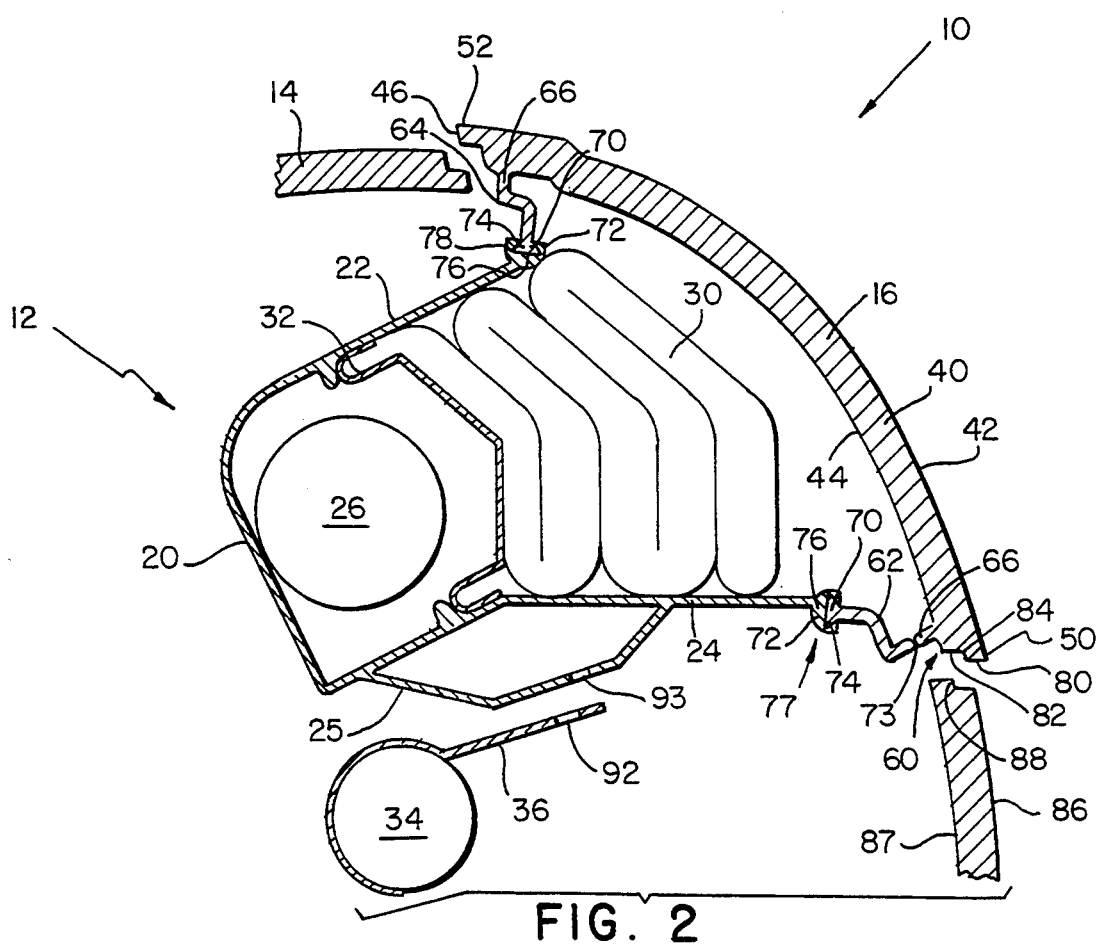
FIG. 2 is a simplified fragmentary cross sectional view of the air bag module unit installation within the vehicle instrument panel of FIG. 1, showing the air bag module door joined to the reaction canister with the module door being positioned over an air bag deployment opening, prior to securing the air bag module unit to the vehicle.

The items shown in the drawings have been simplified and not necessarily drawn to scale in order to facilitate illustration and comprehension of various of the detailed aspects of the invention.

DETAILED DESCRIPTION OF THE INVENTION

The present invention, as is described in more detail below, provides an improved air bag module door and installation method whereby an air bag module door is positioned within an opening in a vehicular interior trim structure and the door is secured to an air bag module unit within the vehicle.

While the invention is described hereinafter with particular reference to a passenger side air bag module assembly for automotive vehicles including vans, pickup trucks, and particularly automobiles, it is to be understood that the invention also has applicability not only with other types or kinds of air bag module assemblies for automotive vehicles including driver side assemblies, but also with other types of vehicles including, for example, airplanes. With respect to automotive vehicles it will also be appreciated that due to usual physical differences between passenger and driver side air bag module assemblies, including the typical difference in size with passenger side air bags generally being much larger than those used in driver side assemblies, the invention is perceived to have particular initial utility in passenger side air bag module assemblies.

Referring to FIGS. 1, 2, 3A and 3B there is illustrated a vehicle and an air bag module unit for installation therein, generally designated by the reference numerals 10 and 12, respectively. As shown, the unit 12 is mounted in and on the interior trim structure of the vehicle 10, e.g., the instrument panel 14, in such a manner as to face a front seat passenger (not shown).

Included in the air bag module unit 12 is an air bag module door 16, a reaction canister 20 having an upper side wall 22, a lower side wall 24 (where upper and lower are in reference to the normal position of a unit placed within the vehicle) and an attachment bracket 25, an inflator 26, and an air bag 30. Also included in the unit 12 is a diffuser/air bag retainer device 32 which serves to retain the air bag to the unit upon deployment and which can also assist in the diffusion of inflation gas issuing from the inflator 26 and into the air bag 30.

The vehicle 10 also includes a cross vehicle beam 34 and a module mounting bracket 36 joined, e.g., bonded or welded, thereabout. The use of the mounting bracket 36 will be described in greater detail below.

The air bag module door 16 includes a face portion 40 having an upper surface 42, a lower surface 44, and a peripheral surface 46 therebetween. The face portion 40 is generally rectangular in shape having first and second opposed longitudinal side 50 and 52 and first and second opposed lateral sides 54 and 56. The face portion 40 provides closure to an opening 60 in the instrument panel 14 wherethrough the air bag 30 is deployable.

The module door 16 includes first and second flexible legs 62 and 64, extending from the face portion 40, specifically the lower surface 44 thereof, toward the reaction canister 20 along the first and second longitudinal sides, 50 and 52, respectively. The flexible legs 62 and 64 extend near the full longitudinal length of the face portion 40 and each includes a first end 66 joined to the lower surface 44 of the face portion 40 and a second end 70 joinable to a corresponding mounting section 72 the module unit 12.

It will be noted that the flexible leg 62, intermediate the ends 66 and 70, includes a tear way 73. The tear way 73 is in the nature of a pre-weakened zone, such as by perforating or reducing the thickness of the leg, for example, along such a preformed tear way. The use of such a tear way in the operation of a module door of the invention will be described in more detail below.

In the illustrated assembly, the second ends 70 of the legs 62 and 64, respectively, are shown joined to canister side walls 22 and 24, respectively. The second ends 70 each include a male form slide-in connector attachment feature 74 sliding into a corresponding female form slide-in connector attachment feature 76 formed at the ends 77 and 78 of the lower and upper side walls 24 and 22, respectively.

The peripheral surface 46 has a stepped configuration forming an upper step 80 and a lower step 82 so as to form an intermediary surface 84 between the upper surface 42 and the lower surface 44. The instrument panel 14 also has a stepped configuration about the opening 60 and includes an outer surface 86, an inner surface 87, and a transitional surface 88 therebetween. The stepped configuration of the door 16 corresponds to the stepped configuration of the instrument panel 14 about the opening 60 such that the intermediary surface 84 is supported by an underlying portion 90 formed by the instrument panel 14 (see FIG. 3A).

The flexible legs 62 and 64 permit the door 16 to be floatably joined to the canister 20 so that the floatably joined door can be desirably positioned over the opening 60 prior to the unit 12 being rigidly secured to the vehicle 10. That is, the floatably joined door can be desirably and properly positioned in the longitudinal, lateral and/or vertical directions about the opening 60 prior to being rigidly secured in position. For purposes of discussion, movement in the longitudinal direction refers to movement of the face portion of the module door coaxially to the longitudinal sides thereof (e.g., for module door 16, movement coaxially with longitudinal sides 50 and 52), movement in the lateral direction refers to movement of the face portion of the module door coaxially to the lateral sides thereof (e.g., for module door 16, movement coaxially with lateral sides 54 and 56), and movement in the vertical direction refers to movement in the direction of the plane perpendicular to the plane of the face portion of the module door. Once so positioned, the module unit 12 is rigidly secured to the vehicle 10.

Figure 3A:
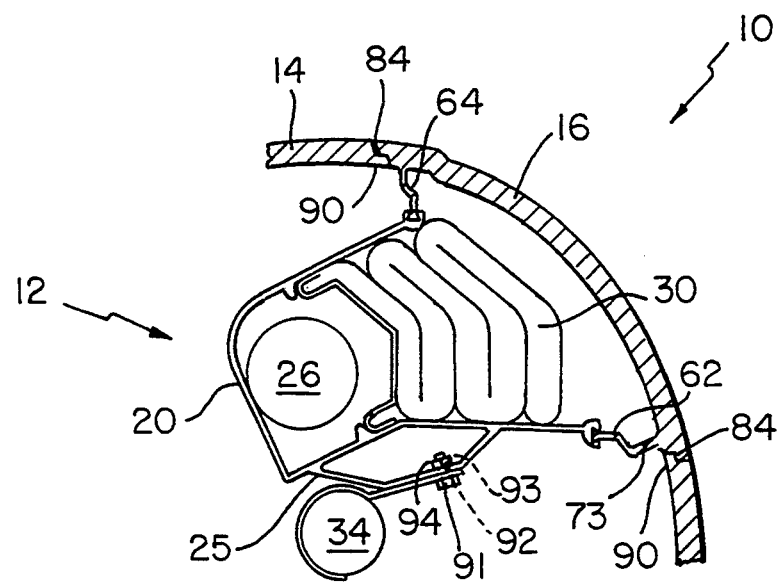
FIGS. 3A and 3B are simplified fragmentary cross sectional views of an air bag module unit installation within a vehicle instrument panel, showing the air bag module unit of FIG. 1 secured to the vehicle, prior and upon air bag deployment, respectively.

Specifically referring to FIG. 3A, such rigid securement is effected by means of passing a fastener such as a bolt 91 through an opening 92 provided in the mounting bracket 36 and an opening 93 provided in the reaction canister attachment bracket 25 and securing the bolt with a nut 94. It will be appreciated that upon so rigidly securing the module unit 12 to the vehicle 10, the flexible legs 62 and 64 become tensioned and the module door 16 becomes fixed in position relative to the air bag deployment opening 60 in at least two of the selected directions.

Figure 3B:
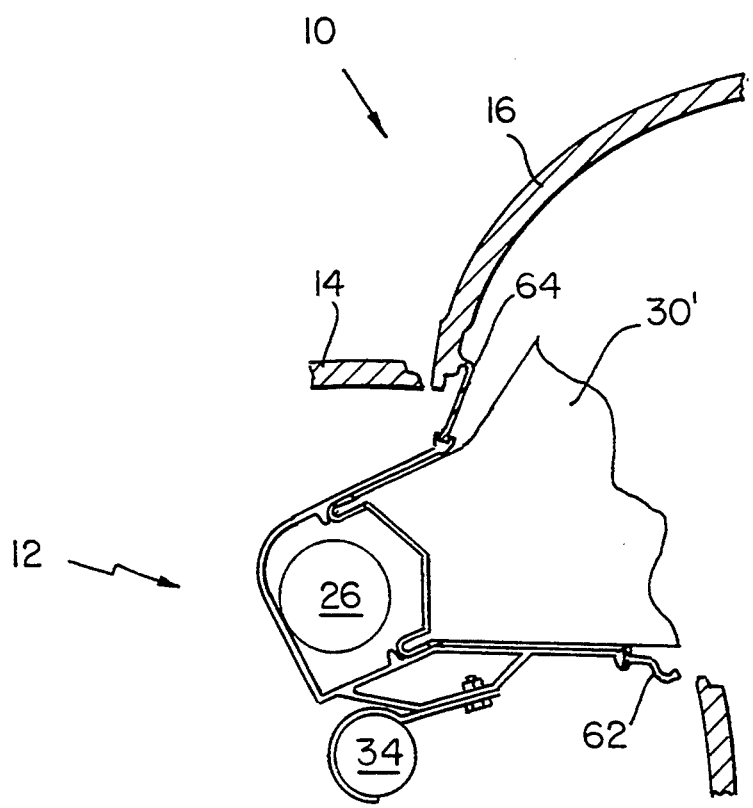

FIG. 3B illustrates the air bag module unit 12 secured to the vehicle 10 during air bag deployment. As a result of the force exerted against the module door 16 by way of the inflating air bag 30', the leg 62 has torn or broken along the tear way 73, i.e., decoupled, permitting the module door 16 to hinge open about the still intact and extended flex leg 64. In this way, the module door 16 opens to permit the inflating air bag 30' to deploy through the opening 60 to provide desired cushioning to a specifically positioned occupant.

It will be appreciated that the module doors of the invention can be appropriately designed to permit and facilitate other means or techniques for opening of the module door.

Figure 4A:
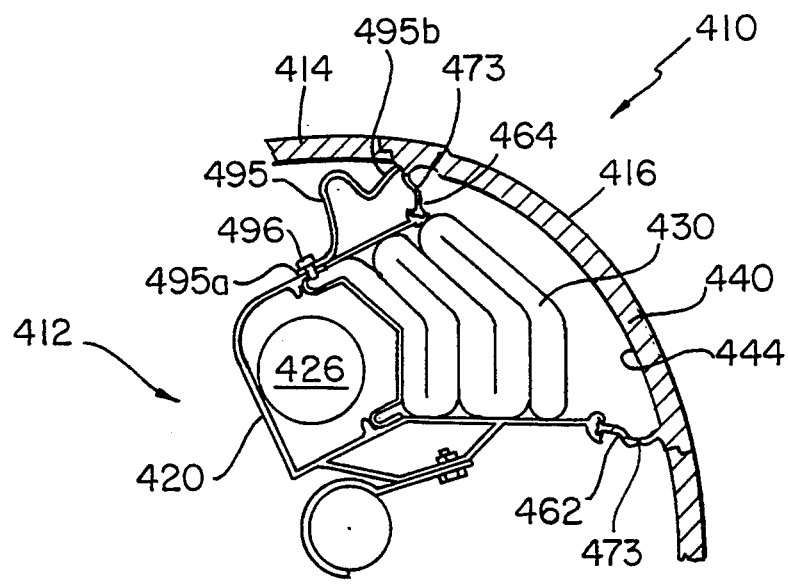
FIGS. 4A and 4B are simplified fragmentary cross sectional views of an air bag module unit installation within a vehicle instrument panel, showing an air bag module unit having a module door in accordance an alternative embodiment of the invention, with the module door in a closed and opened position, respectively.
Figure 4B:
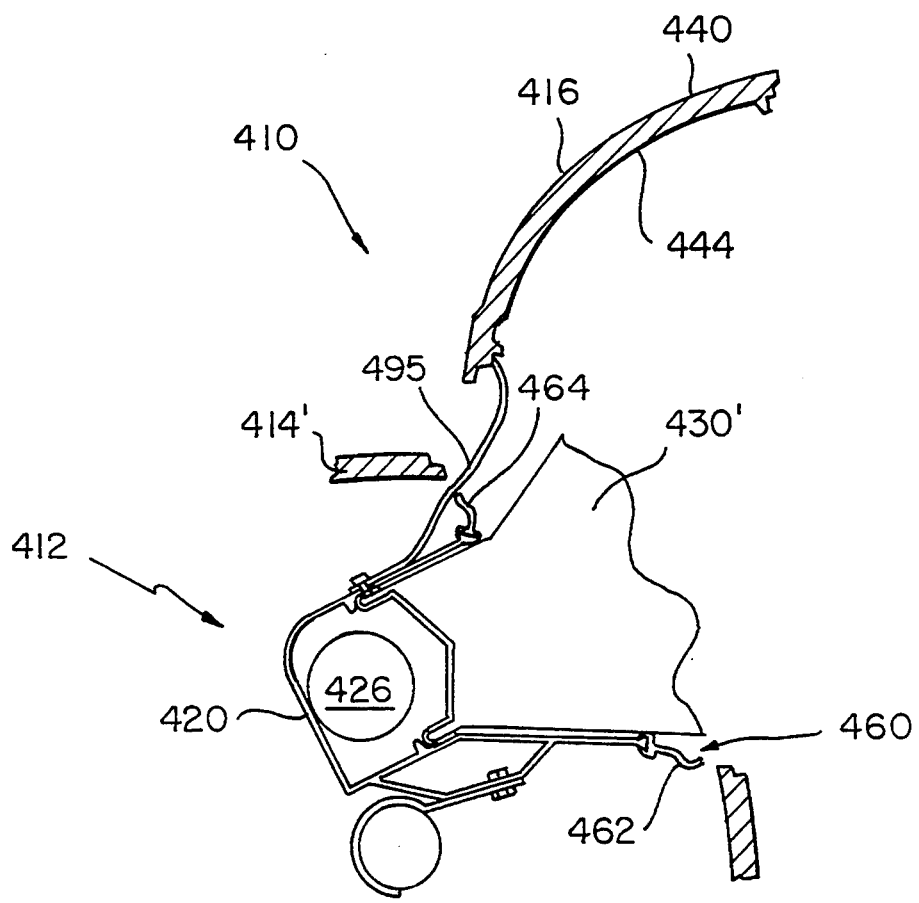

For example, FIGS. 4A and 4B illustrate a vehicle 410 in which an air bag module unit 412 is positioned at the instrument panel 414. The air bag module unit 412 is similar to that described above with reference to FIGS. 1, 2, 3A, and 3B, including a module door 416, a reaction canister 420, an inflator 426, an air bag 430, etc. The module door 416, however, is in accordance an alternative embodiment of the invention. In this embodiment, both flexible legs 462 and 464 include tear ways 473. Thus as a result of the force exerted against the module door 416 by way of the inflating air bag 430' the legs 462 and 464 both tear or brake along the tear ways 473, respectively.

The module door 416, however, is retained to the unit by means of a restraining device, such as a tether 495, such as made of a strip of elastic material, such as of nylon or polyester, for example, which extends between the module door 416 and the reaction canister 420 and joined thereto such as by means known in the art. In the illustrated embodiment, a first end 495a of the tether 495 is joined to the reaction canister 420 by means of a bolt 496 and a second end 495b of the tether 495 is molded into the lower surface 444 of the face portion 440 of the module door 416.

In this way, the module door 416 opens to permit the inflating air bag 430' to deploy through the opening 460 to provide desired cushioning to a specifically positioned occupant while securing the separated door within the vehicle in a fashion which prevents undesired contact of the occupant by the separated door.

Figure 5A:
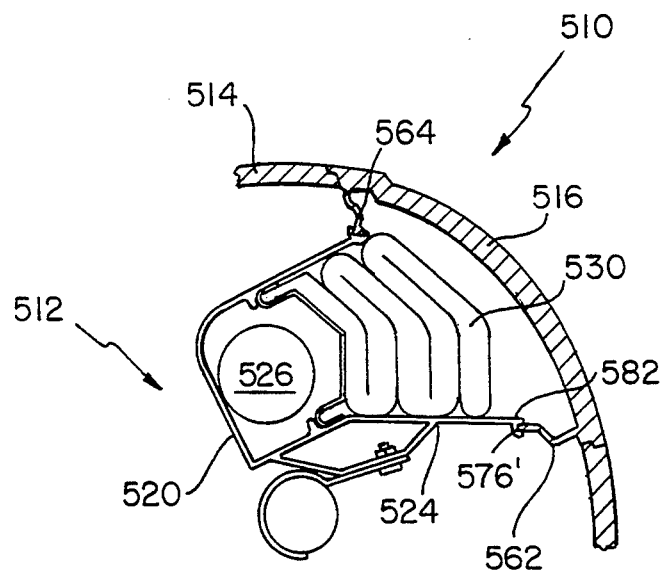
FIGS. 5A and 5B are simplified fragmentary cross sectional views of an air bag module unit installation within a vehicle instrument panel, showing an air bag module unit having a module door in accordance another alternative embodiment of the invention, with the module door in a closed and opened position, respectively.
Figure 5B:
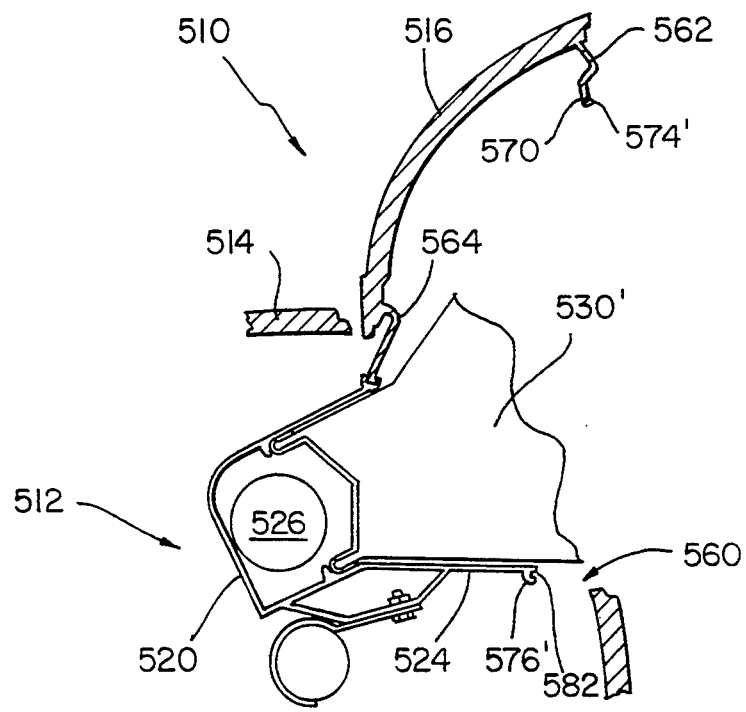

FIGS. 5A and 5B illustrate yet another embodiment of the invention wherein a vehicle 510 has an air bag module unit 512 positioned at the instrument panel 514. The air bag module unit 512 is similar to that described above with reference to FIGS. 1, 2, 3A, and 3B, including a module door 516, a reaction canister 520, an inflator 526, an air bag 530, etc. The module door 516, however, is in accordance yet another embodiment of the invention.

In this embodiment, the module door 516 is designed to disengage from the reaction canister 520 as a result of the force exerted against the module door 516 by way of the inflating air bag 530' by way of incorporating a male form of snap-in connector 574' at the second end 570 of leg 562, rather than a slide-in form of connector and not including a tear way therein. Also, the female form connector 576' at the end 582 of canister 520 side wall 524 correspondingly is of a snap-in form.

In general, slide-in connectors are longitudinally inserted into a corresponding receiving channel whereas snap-in connectors are vertically inserted into a corresponding receiving channel. Thus, snap-in connectors are generally rounded or tapered in the direction of insertion to facilitate such vertical insertion.

As a result of the force exerted against the module door 516 by way of the inflating air bag 530', the leg 562 snaps out of engagement with the reaction canister connector 576', permitting the module door 516 to hinge open about the still intact and extended flex leg 564. In this way, the module door 516 opens to permit the inflating air bag 530' to deploy through the opening 560 to provide desired cushioning to a specifically positioned occupant.

It will be appreciated that, if desired, an air bag module unit in accordance with the invention could incorporate such snap-in forms of connectors on each leg resulting in the legs becoming disengaged from the canister. In such a design, a tether, such as described above, could be used to secure the separated door within the vehicle in a fashion which prevents undesired contact of the occupant by the separated door.

Figure 6A:
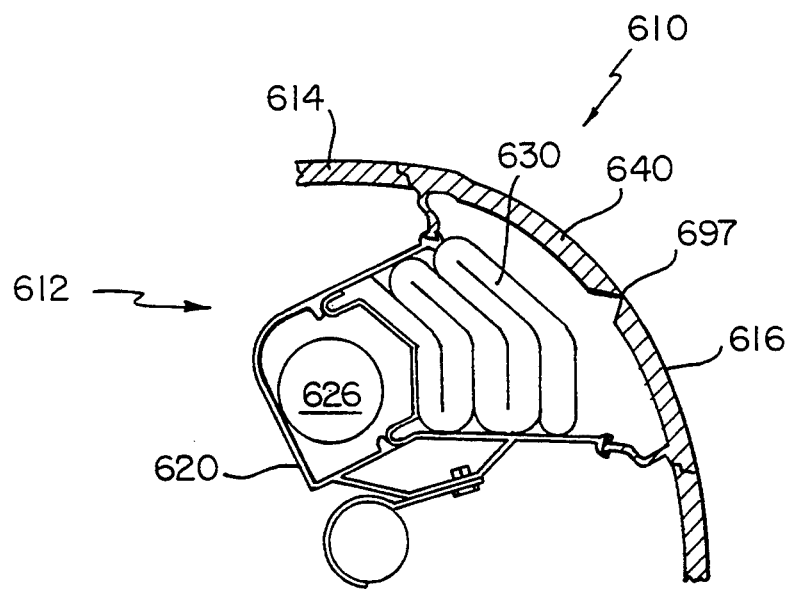
FIGS. 6A and 6B are simplified fragmentary cross sectional views of an air bag module unit installation within a vehicle instrument panel, showing an air bag module unit having a module door in accordance yet another alternative embodiment of the invention, with the module door in a closed and opened position, respectively.
Figure 6B:
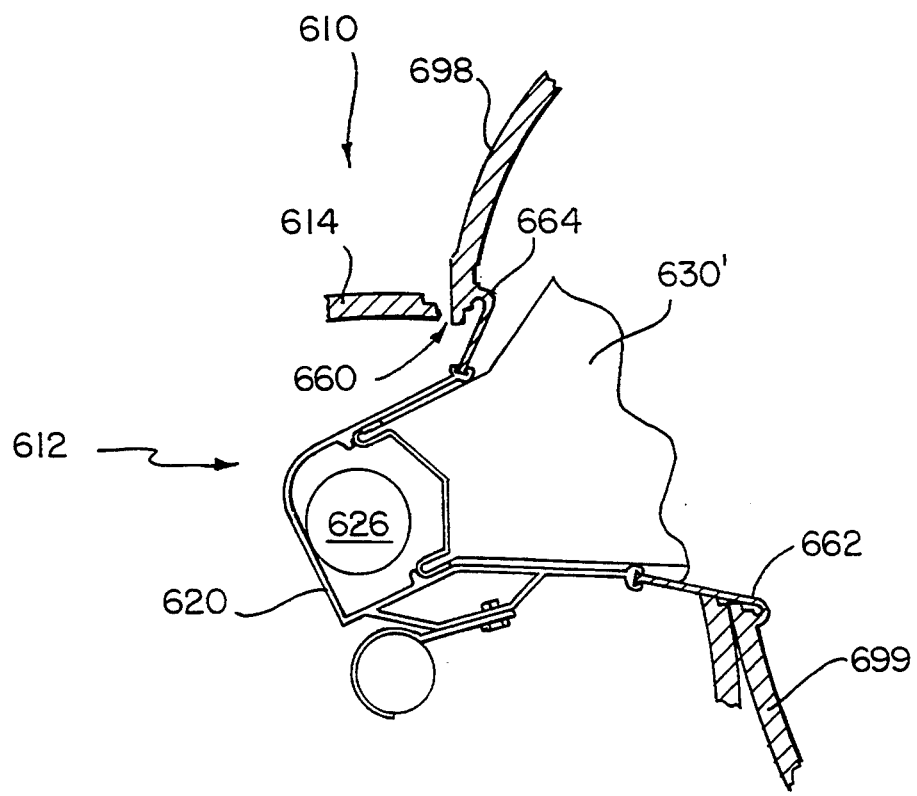

FIGS. 6A and 6B illustrate yet another embodiment of the invention wherein a vehicle 610 has an air bag module unit 612 positioned at the instrument panel 614. The air bag module unit 612 is similar to that described above with reference to FIGS. 1, 2, 3A, and 3B, including a module door 616, a reaction canister 620, an inflator 626, an air bag 630, etc. The module door 616, however, is in accordance yet another embodiment of the invention.

In this embodiment, rather than the leg(s) having tear ways therein, the face portion 640 of the module door 616 includes one or more tear ways 697 therein designed to tear or otherwise open along predetermined lines as a result of the force exerted on the closure by way of the inflating air bag 630' and thus form air bag release doors 698 and 699. The air bag release doors 698 and 699 each remain joined to the module unit 612 by means of extended flex legs 664 and 662, respectively. In this way, and such as in the event of a particular collision by a vehicle so equipped, the inflating air bag 630' will deploy through the opening 660 to provide desired cushioning to a specifically positioned occupant while the module door 616 remains secured in the module unit 612 and vehicle 610.

Further, it will be appreciated that the module doors of the invention, specifically the flexible legs thereof can vary in a number of particulars including the width, length, and number and the specific form or shape and dimensions of the connector at the end thereof. For example, modules doors in accordance with the invention can include 2 or more flexible legs extending from the respective selected side of the face portion rather a single flexible leg extending from opposed ends of the module door, as shown in the above-described embodiments. In general, the number of flexible legs extending from a respective end of a module door can very from one up to 10 or more, dependent upon the amount and extent of positional adjustment allowed for in the system design.

In general, a door having two full length legs on opposite longitudinal sides thereof, such as described above, will facilitate more effective vertical adjustment of the module door within the air bag deployment opening prior to the module unit being rigidly joined to the vehicle. On the other hand, the use of floating legs of smaller width generally allows greater lateral adjustment of the module door within the air bag deployment opening prior to the module unit being rigidly joined to the vehicle.

Figure 7A:
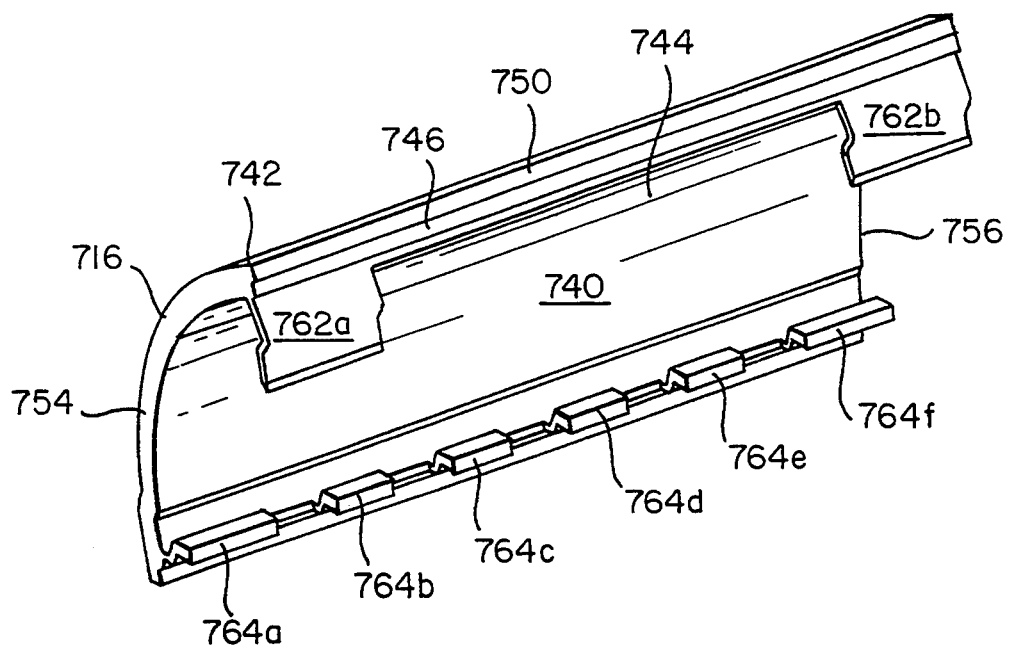
FIGS. 7A and 7B are perspective bottom and angled views, respectively of an air bag module door in accordance with one embodiment of the invention.
Figure 7B:
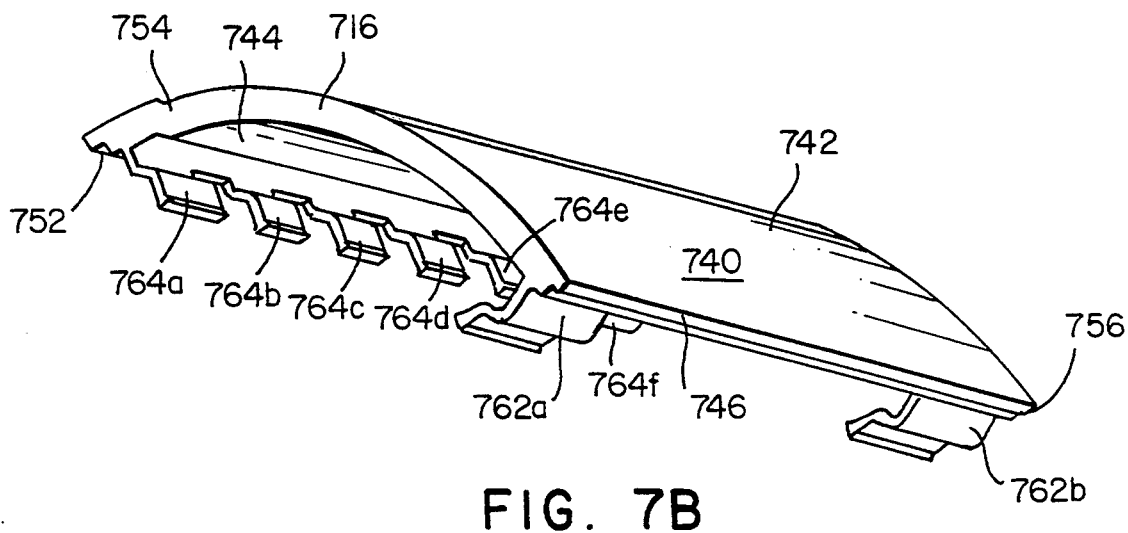
Figure 8A:
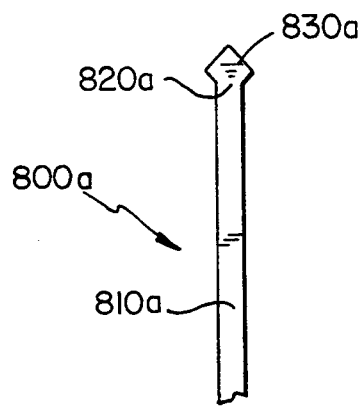
FIGS. 8A, 8B, 8C, and 8D are enlarged fragmentary elevation views of air bag module door flexible legs in accordance with various embodiments of the invention.
Figure 8B:
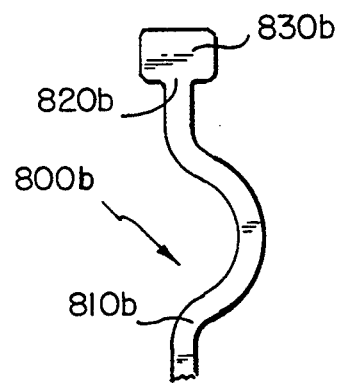
Figure 8C:
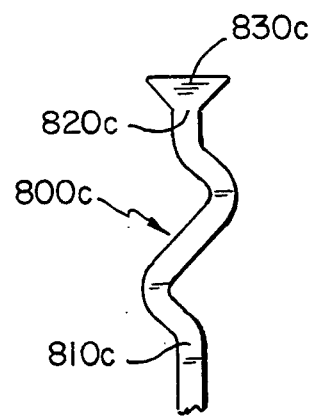
Figure 8D:
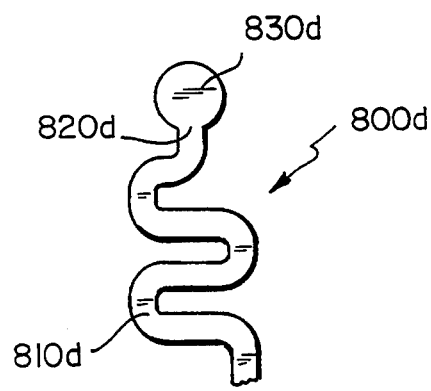

FIGS. 7A and 7B illustrate an air bag module door 716 in accordance with an alternative embodiment of the invention. Similar to the module door 16 shown in FIGS. 1, 2, 3A and 3B, the module door 716 includes a face portion 740 having an upper surface 742, a lower surface 744 and a peripheral surface 746, with first and second longitudinal sides 750 and 752, respectively, and first and second lateral sides 754 and 756, respectively, etc.

The module door 716 differs from module door 16, however, in that rather than a single leg on each longitudinal side the module door, module door 716 includes two legs 762a and 762b on the first side 750 and a plurality (e.g., more than 2) legs 764a, 764b, 764c, 764d, 764e and 764f on the second side 752.

Further, the module door 716 is designed to facilitate pivotal hinging open upon air bag deployment. That is, upon air bag deployment, the legs 764a-f remain connected to the reaction canister while the legs 762a and 762b having a snap-in male form connector disengage from the corresponding snap-in female form connector on the reaction canister.

FIGS. 8A, 8B, 8C, and 8D illustrate air bag module door flexible legs in accordance with various embodiments of the invention. Each of the flexible legs 800(a-d) includes a body 810(a-d) having an end 820(a-d) whereat each of the legs includes a male form attachment feature 830(a-d) whereby said legs are joinable, such as by slide-in connection, for example, with a corresponding female form connector, such as on a reaction canister of the corresponding module unit. As is shown, as will be appreciated, such male form attachment features can be of various design including diamond 830a, rectangular 830b, triangular 830c, and circular 830d, for example.

It will be appreciated, that while in the above-described preferred embodiments, the flexible legs are shown integrally formed with the face portion such as by being molded or extruded therewith as the door is formed during such molding or extrusion fabrication, the invention in its broader aspects is not so limited. Thus, it is to be understood that, if desired, the flexible leg(s) can be joined to the door such as, for example, by riveting, vulcanizing, bolting, or molding the leg to the door as well as, for example, by alternative standard fastening techniques such as by slide-in connection.

Similarly, the joining of the flexible legs to the module unit, while described above with reference to slide-in and snap-in forms of connectors, can, if desired, be accomplished by other means known in the art such as by use of fasteners such as rivets, bolts or screws, for example.

It is to be understood that the module door of the invention can be made of any of the materials of construction used for inflatable restraint system covers/doors, including, for example: thermoplastic polycarbonates or rubbers, resins and composites thereof.

It will also be appreciated that as the module door flexible legs used in the invention will generally be required to permit the floatably joined door to move in at least two of selected directions, as described above, the legs will preferably be constructed of a material of an elastic nature. Such an elastic material can include: natural rubber, synthetic elastomer, or a plastic material, for example. Specific types of such elastic materials include: nitrile rubber (NBR), buna-n rubber, butadiene-styrene copolymer rubbers (SBR), silicone rubber, vinyls, and polyesters, for example.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An air bag module door for an air bag module unit, said module door comprising:
   a face portion to provide closure to an opening in an interior trim structure of a vehicle wherethrough an air bag is deployable, said face portion having an upper surface, a lower surface and a peripheral surface between the upper and lower surfaces, said module door having at least a portion of the peripheral surface supported by an underlying portion of the interior trim structure, and
   at least one first flexible leg joined at a first end to said face portion and joinable at a second end to a corresponding mounting section of the module unit, said flexible leg permitting said face portion to be positioned about the air bag deployment opening as the module unit is secured to the vehicle and wherein said flexible leg becomes tensioned as said module door is fixed in position relative to the air bag deployment opening.

2. The air bag module door of claim 1 wherein said first flexible leg is integral to said face portion.

3. The air bag module door of claim 1 wherein said module unit includes a reaction canister comprising the corresponding mounting section comprising a female form slide-in connector to which the second end of said first leg is joinable and wherein said second end comprises a mating male form slide-in connector for slide-in fastenerless connection with the female form slide-in connector of the reaction canister.

4. The air bag module door of claim 1 wherein said face portion additionally comprises a tear way adapted to tear under the influence of inflating of the air bag to define at least one air bag release door.

5. The air bag module door of claim 1 wherein said peripheral surface includes first and second opposed longitudinal sides with said first flexible leg joined to said face portion at the lower surface and adjacent the first opposed longitudinal side, said module door additionally comprising:
   at least one second flexible leg joined at a first end to the lower surface of the face portion and adjacent the second opposed longitudinal side and joinable at a second end to a corresponding mounting section of the module unit, said second flexible leg cooperating with said first flexible leg to permit said face portion to be positioned about the air bag deployment opening as the module unit is secured to the vehicle.

6. The air bag module door of claim 5 wherein said first leg includes at least one tear way intermediate said first and second ends, said tear way adapted to tear under the influence of inflating of the air bag whereby at least the first opposed longitudinal side is decoupled from the mounting section to permit the air bag to deploy through the opening.

7. The air bag module door of claim 6 wherein said module unit includes a reaction canister comprising the corresponding mounting sections to which the second ends of said first and second legs are joinable and wherein said second leg includes at least one tear way intermediate said first and second ends, said tear way adapted to tear under the influence of inflating of the air bag whereby the second opposed longitudinal side is also decoupled to permit the air bag to deploy through the opening, said module door having a restraining device extending therefrom to the reaction canister, said restraining device joining said module door to the reaction canister after said first and second leg tear ways have torn.

8. The air bag module door of claim 5 having more than one leg joined to the lower surface of the face portion and adjacent the first opposed longitudinal side.

9. The air bag module door of claim 8 having a greater number of legs adjacent the first opposed longitudinal side than the number of legs adjacent the second opposed longitudinal side.

10. The air bag module door of claim 5 wherein said module unit includes a reaction canister comprising the corresponding mounting sections each comprising a female form slide-in connector, wherein said first leg is integral to said face portion and includes at least one tear way intermediate said first and second ends, said tear way adapted to tear under the influence of inflating of the air bag whereby at least the first opposed longitudinal side is decoupled to permit the air bag to deploy through the opening, and wherein the second end of said first leg comprises a mating male form slide-in connector for slide-in fastenerless connection with the corresponding female form slide-in connector of the reaction canister.

11. The air bag module door of claim 10 wherein said second leg is integral to said face portion and includes at least one tear way intermediate said first and second ends, said tear way adapted to tear under the influence of inflating of the air bag whereby the second opposed longitudinal side is also decoupled to permit the air bag to deploy through the opening, and wherein said second end of said second leg comprises a male form slide-in connector for slide-in fastenerless connection with a corresponding mating female form slide-in connector of the reaction canister.

12. An air bag module door for an air bag module unit including a reaction canister, said module door comprising:
- a face portion to provide closure to an air bag deployment opening in an instrument panel of a vehicle, said face portion having an upper surface, a lower surface and a peripheral surface between the upper and lower surfaces with the peripheral surface including at least two opposed longitudinal sides, said module door having at least a portion of the peripheral surface supported by an underlying mating surface portion of the instrument panel,
- at least one first flexible leg integral with the lower surface of the face portion and adjacent a first of said opposed longitudinal sides, said first flexible leg permitting said face portion to be positioned about the air bag deployment opening as the module unit is rigidly secured to the vehicle, said first flexible leg having a male form slide-in connector at an end thereof for slide-in fastenerless connection with a corresponding mating female form slide-in connector on the reaction canister, and
- at least one second flexible leg integral with the lower surface of the face portion and adjacent a second of said opposed longitudinal sides, said second flexible leg further permitting said face portion to be positioned about the air bag deployment opening as the module unit is rigidly secured to the vehicle, said second flexible leg having a male form connector at an end thereof for snap-in engagement with a corresponding mating female form snap-in connector on the reaction canister and wherein, under the influence of an inflating air bag, the male form snap-in connector disengages from the female form snap-in connector as the air bag deploys out of the opening with said face portion pivotally hinging open about at least said first flexible leg.

13. The air bag module door of claim 12 having more than one leg joined to the lower surface of the face portion and adjacent the first opposed longitudinal side.

14. The air bag module door of claim 13 having a greater number of legs adjacent the first opposed longitudinal side than are adjacent the second opposed longitudinal side.

15. A method for positioning an air bag module door within an instrument panel air bag deployment opening of a vehicle and securing the module door to an air bag module unit within the vehicle, wherein the module door includes:
- a face portion to provide closure to the air bag deployment opening, the face portion having an upper surface, a lower surface and a peripheral surface between the upper and lower surfaces, and
- at least one integral flexible leg having an end joinable to a corresponding mounting section of the module unit, said method comprising the steps of:
  a) floatably joining said module door to the module unit by means of joining the end of said leg to the corresponding mounting section of the module unit, and
  b) positioning the floatably joined module door over the air bag deployment opening with at least a portion of the peripheral surface of said face portion supported by an underlying portion of the instrument panel, whereby said floatably joined door can move in at least two directions relative to the air bag deployment opening selected from longitudinally, laterally, and vertically and wherein said method additionally comprises the step of:
  c) rigidly securing the module unit to the vehicle whereby the joined flexible leg becomes tensioned and said module door is fixed in position relative to the air bag deployment opening in said at least two selected directions.

16. The method of claim 15 wherein the end of said leg comprises a male form slide-in connector and the corresponding mounting section of the module unit comprises a corresponding mating female form slide-in connector, said step of floatably joining said module door to the module unit comprises the steps of:
- sliding the male form slide-in connector at the end of said leg into the female slide-in connector of the mounting section of the module unit.

17. The method of claim 15 wherein said face portion additionally comprises a tear way adapted to tear under the influence of inflating of the air bag to define at least one air bag release door.

18. The method of claim 15 wherein said peripheral surface includes first and second opposed longitudinal sides with at least one first flexible leg joined to the lower surface of the face portion and adjacent the first opposed longitudinal side and with at least one second flexible leg joined at a first end to the lower surface of the face portion and adjacent the second opposed longitudinal side, wherein the joinable end of said first and second legs comprise a male form slide-in connector and the corresponding mounting section of the module unit comprises corresponding mating female form slide-in connectors, said step of floatably joining said module door to the module unit comprises the steps of:
- sliding the male form slide-in connector at the end of said first leg into the corresponding female slide-in connector of the mounting section of the module unit and
- sliding the male form slide-in connector at the end of said second leg into the corresponding female slide-in connector of the mounting section of the module unit.

19. An air bag module door for an air bag module unit, said module door comprising:
- a face portion to provide closure to an opening in an interior trim structure of a vehicle wherethrough an air bag is deployable, said face portion having an upper surface, a lower surface and a peripheral surface between the upper and lower surfaces, with at least a portion of the peripheral surface supported by an underlying portion of the interior trim structure, said face portion comprising a tear way adapted to tear under the influence of inflating of the air bag to define at least one air bag release door, and
- at least one first flexible leg integral with said face portion at a first end and joinable at a second end to a corresponding mounting section of the module unit, said flexible leg and said face portion being a one-piece unit with said flexible leg permitting said face portion to be positioned about the air bag deployment opening as the module unit is secured to the vehicle and wherein said flexible leg becomes tensioned as said module door is fixed in position relative to the air bag deployment opening.

20. The air bag module door of claim 19 wherein said first leg includes at least one tear way intermediate said first and second ends.

* * * * *